(12) United States Patent
Hall et al.

(10) Patent No.: US 6,708,981 B2
(45) Date of Patent: Mar. 23, 2004

(54) SEAL ASSEMBLIES

(75) Inventors: Leonard Arthur Hall, Cippenham (GB); Wayne Darren Read, Maidenhead (GB)

(73) Assignee: John Crane UK Limited, Slough (GB)

( * ) Notice: Subject to any disclaimer, the term of this patent is extended or adjusted under 35 U.S.C. 154(b) by 234 days.

(21) Appl. No.: 09/791,169

(22) Filed: Feb. 22, 2001

(65) Prior Publication Data

US 2001/0017445 A1 Aug. 30, 2001

(30) Foreign Application Priority Data

Feb. 24, 2000 (GB) .............................................. 0004239

(51) Int. Cl.⁷ ............................ F16J 15/40; F02C 7/06; F01D 11/00; F04B 17/00
(52) U.S. Cl. ...................... 277/431; 277/432; 60/39.08; 415/175; 417/372
(58) Field of Search ................................ 277/431, 432; 60/39.08, 657; 415/175, 112; 417/372

(56) References Cited

U.S. PATENT DOCUMENTS

| | | | |
|---|---|---|---|
| 2,485,447 A | * 10/1949 | Keller | 277/431 |
| 3,508,758 A | * 4/1970 | Strub | 277/432 |
| 3,919,854 A | * 11/1975 | Denis | 277/431 |
| 4,005,580 A | 2/1977 | Swearingen | |
| 4,193,603 A | * 3/1980 | Sood | 277/303 |
| 4,582,327 A | * 4/1986 | Swearingen | 277/303 |
| 5,249,812 A | * 10/1993 | Volden et al. | 277/361 |
| 5,412,977 A | 5/1995 | Schmohl et al. | |
| 5,454,689 A | * 10/1995 | Falavigna | 277/303 |
| 5,636,847 A | * 6/1997 | Ostrowski | 277/317 |
| 5,760,292 A | * 6/1998 | Jostein | 73/40 |
| 6,305,691 B1 | * 10/2001 | Fuse | 277/348 |
| 6,398,484 B1 | * 6/2002 | Orikasa et al. | 415/111 |

FOREIGN PATENT DOCUMENTS

| | | | |
|---|---|---|---|
| EP | 0570086 A | 11/1993 | |
| EP | 1008759 A1 | * 6/2000 | .......... F04D/29/14 |
| GB | 1267548 | 3/1972 | |
| WO | WO 97/01053 | 1/1997 | |

* cited by examiner

Primary Examiner—Anthony Knight
Assistant Examiner—Vishal Patel
(74) Attorney, Agent, or Firm—Davis & Bujold, P.L.L.C.

(57) ABSTRACT

A seal assembly (22) for sealing a pressurized gaseous product includes, a pair of seals (24,26) spaced axially to provide a chamber (28) therebetween, a gas seal (24) being disposed on the inboard side of the seal assembly (22) between the sealed gaseous product and the chamber (28), an inlet (38) opening to the side of the gas seal (24) exposed to the gaseous product, the inlet (38) being connected to a supply of clean gas, the chamber (38) defined between the seals (24,26) being connected to a reservoir (50), the reservoir (50) being connected back to inlet (38) via a pressure intensifier (70) and the reservoir (50) being connected to the supply of clean gas, so that additional clean gas may be supplied thereto, when pressure in the reservoir (50) falls below a predetermined minimum value.

18 Claims, 2 Drawing Sheets

SEAL ASSEMBLIES

BACKGROUND TO THE INVENTION

The present invention relates to seal assemblies and in particular to seal assemblies utilising dry gas seals.

In seal assemblies for, for example, gas compressors, it is common practice to provide seal assemblies on either side of the impellor shaft, to seal the compressor chamber on the suction and discharge side. Such seal assemblies typically include a pair of gas seals spaced axially of one another to define a chamber therebetween.

Leakage across the inboard gas seal is collected in the chamber defined between the two gas seals and, hitherto, has been ducted away to a flare stack or atmospheric vent.

Leakage under dynamic conditions is typically from 20 to 100 standard liters per minute, depending on the suction pressure of the compressor.

Because the product gas may be contaminated, it is conventional practice to provide a supply of filtered product gas to the product side of the inboard seal. Product gas is supplied either from a higher pressure stage of the compressor or alternative supply and is fed through a filter system and delivered back to the product side of the inboard seal. In order to ensure flow of the filtered gas, the product sides of the inboard seals are run at suction pressure. The amount of filtered gas delivered to the seals is in excess of the amount of leakage across the seal, so that the excess filtered gas will flow into the compressor chamber, preventing unfiltered product gas therefrom, from coming into contact with the inboard seal.

Such systems function well under dynamic conditions when the compressor is working. However, under static conditions, the pressures on the suction and discharge of the compressor even out. Under such conditions, there is no pressure differential to cause the filtered gas to be delivered to the product side of the inboard seal and pumping of the filtered gas is required. Under static conditions, leakage across the inboard seal will be reduced to of the order of 25% of the dynamic leakage.

The present invention provides a system in which leaking across the inboard seal gas is recirculated, thereby avoiding the need to flare or vent the gas and the consequent loss. An additional benefit is the substantial reduction of emissions into the atmosphere.

SUMMARY OF THE INVENTION

In accordance with one aspect of the present invention, a seal assembly for sealing a pressurised gaseous product comprises a pair of seals spaced axially to provide a leakage collection chamber therebetween, an inboard seal being a gas seal which is disposed between the sealed gaseous product and the chamber, means being provided to supply clean gas to an inlet opening to the side of the inboard seal exposed to the gaseous product, the chamber defined between the seals being connected to a reservoir, the reservoir being connected back to the inlet via a pressure intensifier and means being provided to deliver additional clean gas to the reservoir when pressure in the reservoir falls below a predetermined value.

With the seal assembly described above, clean gas leaking across the inboard seal is collected in the reservoir and is recycled back to the inboard side of the inboard seal, thus avoiding the need to flare or vent off any leakage gas.

Under dynamic conditions, the pressure intensifier is controlled to maintain the pressure in the reservoir between predetermined limits.

Where the system is connected to a flare stack, the predetermined limits will be up to the flare stack back pressure, preferably from 5% to 95% or more preferably from 30% to 95% of the flare stack pressure.

Where the system is vented to atmosphere, the upper predetermined limit is set by the spring load pressure of a non-return valve between the reservoir and atmospheric vent. Preferred limits will be from 5% to 95% or more preferably from 30% to 95% of the spring load pressure.

The flare stack back pressure or spring loaded pressure may be up to 5 barg above atmospheric pressure but is more usually from 1 to 2 barg above atmospheric pressure.

Under static conditions, the pressure intensifier is controlled to provide a flow rate at the inlet to the inboard side of the inboard seal in excess of leakage across the inboard seal, the additional clean gas required to do this, being delivered to the reservoir from a supply of clean gas.

Additional clean gas is introduced into the reservoir to prevent a vacuum forming therein. Preferably additional clean gas will be introduced into the reservoir when the pressure in the reservoir falls below 30% of the flare stack back pressure or the spring load pressure, more preferably additional clean gas is introduced when pressure in the reservoir falls below 0.3 barg.

According to a preferred embodiment of the invention both the inboard and outboard seals defining the leakage collection chamber are gas seals. However, other forms of seals may be used on the outboard side of the chamber, for example segmented carbon rings, close clearance bushes or labrynth seals. Moreover, additional seals may be provided between the inboard seal and the product chamber.

BRIEF DESCRIPTION OF THE DRAWINGS

The invention is now described, by way of example only, with reference to the accompanying drawings, in which.

DESCRIPTION OF A PREFERRED EMBODIMENT

Figure 1:
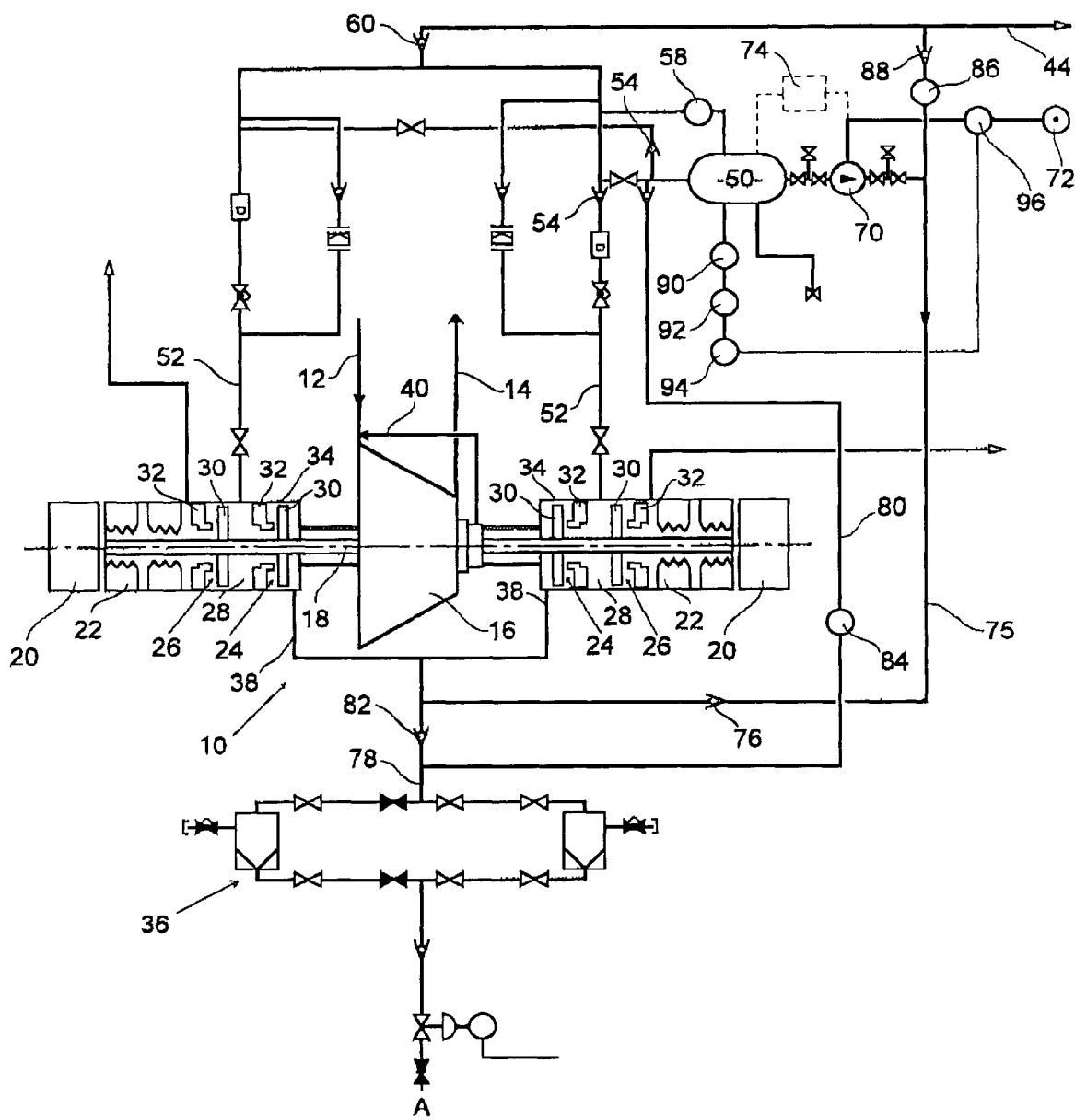
FIG. 1 shows diagrammatically a seal assembly in accordance with the present invention.

FIG. 1 illustrates diagrammatically a compressor 10 having a suction inlet 12 and a discharge outlet 14. An impellor 16 is mounted for rotation on a shaft 18 in bearings 20. Seal assemblies 22 are provided between the compressor housing and the bearings 20. Each seal assembly 22 comprises inner and outer gas seals 24,26 mounted in axially spaced relationship to define a chamber 28 therebetween. The gas seals 24,26 are of conventional design having a rotor 30 mounted for rotation with the shaft 18 and a stator 32 which is mounted for axial movement and sealed with respect to a housing 34. The stator 32 is urged axially into engagement with the rotor 30 by resilient means, not shown. Grooves are provided in the sealing face of either the rotor 30 or stator 32, these grooves acting to generate a cushion of gas between the rotor 30 and stator 32, when the shaft 18 rotates.

Under such dynamic conditions, leakage across the inboard seal 24 is typically of the order of 20 to 100 standard liters per minute, depending on the size, suction pressure and speed of the compressor 10. Under static conditions when the compressor is stationary, the resilient means forces the rotor 30 into engagement with the stator 32, reducing leakage across the inboard seal. Under such static conditions, leakage across the inboard seal 24 is typically of the order of 25% of the dynamic leakage.

Product gas from the discharge outlet 14 of the compressor 10 or a stage of the compressor higher than suction, is tapped off and delivered to a filter assembly 36, at point A. Alternatively gas from an alternative supply may be delivered to point A. The filtered gas is then delivered to inlets 38 opening to the product side of the inboard seals 24. This filtered gas is delivered at a rate in excess of the leakage across the seals 24 so that excess filtered gas will be forced along the shaft 18 into the compressor chamber, preventing the unfiltered product gas which may be contaminated, from reaching the inboard seals 24. The product side of the inboard seal 24 on the discharge side of the compressor 10 is connected by line 40 to the suction inlet 12, so that, under dynamic conditions, the product side of the inboard seal 24 on both sides of the compressor 10, will run at suction pressure. The filtered gas which is at a pressure higher than the suction pressure, will consequently be delivered to the product sides of the seals 24 which are at the lower suction pressure.

In the following description, the connections to the seal assemblies 22 on each side of the compressor are identical, and consequently reference is made to the seal assembly 22 on one side only. Gas leaking across the inboard seal 24 will collect in chamber 28 between the seals 24 and 26. In seals of this type, the operating leakage collected in the chamber 28 would hitherto have been delivered via line 52 to a flare stack 44 or an atmospherhic vent. The pressure in the flare stack 44 would typically be from about 1 to 2 bar above atmospheric pressure but could be as high as 5 bar. Atmospheric vents would be at atmospheric pressure.

In accordance with the present invention, a reservoir 50 is connected to the line 52 between the chamber 28 and the flare stack 44 or atmospheric vent. A non-return valve 54, prevents flow of gas from the reservoir 50 towards chamber 28. A non-return valve 60 is provided between the connection to reservoir 50 and flare stack 44 or atmospheric vent, the non-return valve 60 remaining closed while pressure in line 52 is below flare stack pressure or a determined spring value of the non-return valve 60. While pressure in the line 52 remains below these values, gas leaking past the seal 24 will consequently be collected in the reservoir 50. Should the pressure in the line 52 rise above the flare stack pressure, or the non-return valve spring value, non-return valve 60 will open allowing the gas to escape into the flare stack 44 or atmospheric vent. A pressure safety valve 58 is provided on the reservoir 50, which will connect the reservoir 50 to the flare stack 44 or atmospheric vent, should pressure therein rise above a predetermined value, due to malfunction of the system, for example on failure of seal 24.

A pressure intensifier 70 is connected to the reservoir 50, to pump gas therefrom. The pressure intensifier is preferably a single or two-stage booster pump, in which a piston is driven by either compressed nitrogen, air or pumped fluid from a source 72. Alternatively, other forms of positive displacement pump may be used, for example an electrically driven pump. The pressure intensifier 70 is controlled by a control unit 74. The pressure intensifier 70 delivers gas from the reservoir 50 via line 75 and non-return valve 76, back to the inlet 38, where it is recycled through the seal 24.

The inlet to reservoir 50 is also connected to the line 78 downstream of the filter assembly 36, via a line 80. A non-return valve 82, downstream of line 80, prevents flow of gas from line 75 to line 80. Line 80 also includes a pressure control valve 84, which opens when pressure in the reservoir 50 falls below a predetermined value above vacuum of say 0.3 barg. Line 75 is also connected to the flare stack 44 or atmospheric vent by pressure release valve 86 and a non-return valve 88.

In operation, when the compressor 10 is running, filtered gas will be delivered to the product side of gas seals 24 by inlet 38, due to the pressure differential between the suction and discharge sides of the compressor 10, in conventional manner. Filtered gas leaking past the seals 24, rather than being burnt in the flare stack 44, or released into an atmospheric vent, will be collected in reservoir 50. The pressure intensifier 70 increases the pressure of the leakage gas from the reservoir 50 so that it may be returned to the inlet 38 and recycled. The pressure intensifier 70 is controlled by the control unit 74, to maintain the pressure in the reservoir 50 at between 30% and 95% of the flare stack pressure or non-return valve 60 spring load pressure on a vented system. Under such circumstances, the pressure control valve 84 will remain closed so that no additional filtered gas will be delivered to the reservoir 50. Pressure indicator switches 90,92,94 are connected to the reservoir 50, indicator 90 indicating if pressure in the reservoir 50 is high, indicator 92 indicating if pressure in the reservoir 50 is low and indicator 94 indicating if the pressure in the reservoir 50 is very low. A solenoid valve 96 is automatically operated to close the supply of the motive fluid to the pressure intensifier and thereby to stop pumping from the reservoir 50 if the pressure in reservoir 50 is very low.

Under static conditions, when the compressor 10 is not running, there is no pressure differential between the suction and delivery sides of the compressor 10, to cause filtered gas to flow through inlets 38 to the product side of seals 24. Under these conditions, the pressure intensifier 70 is controlled by the control unit 74, to pump gas from the reservoir 50 to the inlet 38 at a rate in excess of the normal operating leakage across the seals 24, which is typically about 25% of the dynamic leakage. Pumping of the gas at this rate, will cause the pressure in the reservoir 50 to fall and when it falls below the pre-set value (typically 0.3 barg), the pressure control valve 84 will open, allowing additional filtered gas to be drawn from line 78. This gas, as well as that leaking past the seals 24, will then be pumped back to the inlet 38 by the pressure intensifier 70. In this manner, filtered gas is continuously recycled through the seals 24 and creates a clean gas barrier between the gas in the compressor chamber and the seals 24.

Depending on the capacity of the pressure intensifier 70, the system described above would typically be capable of pressure intensification up to about 50 bar. For higher pressure applications, multi-stage pressure intensification may be used, for example as illustrated in FIG. 2.

Figure 2:
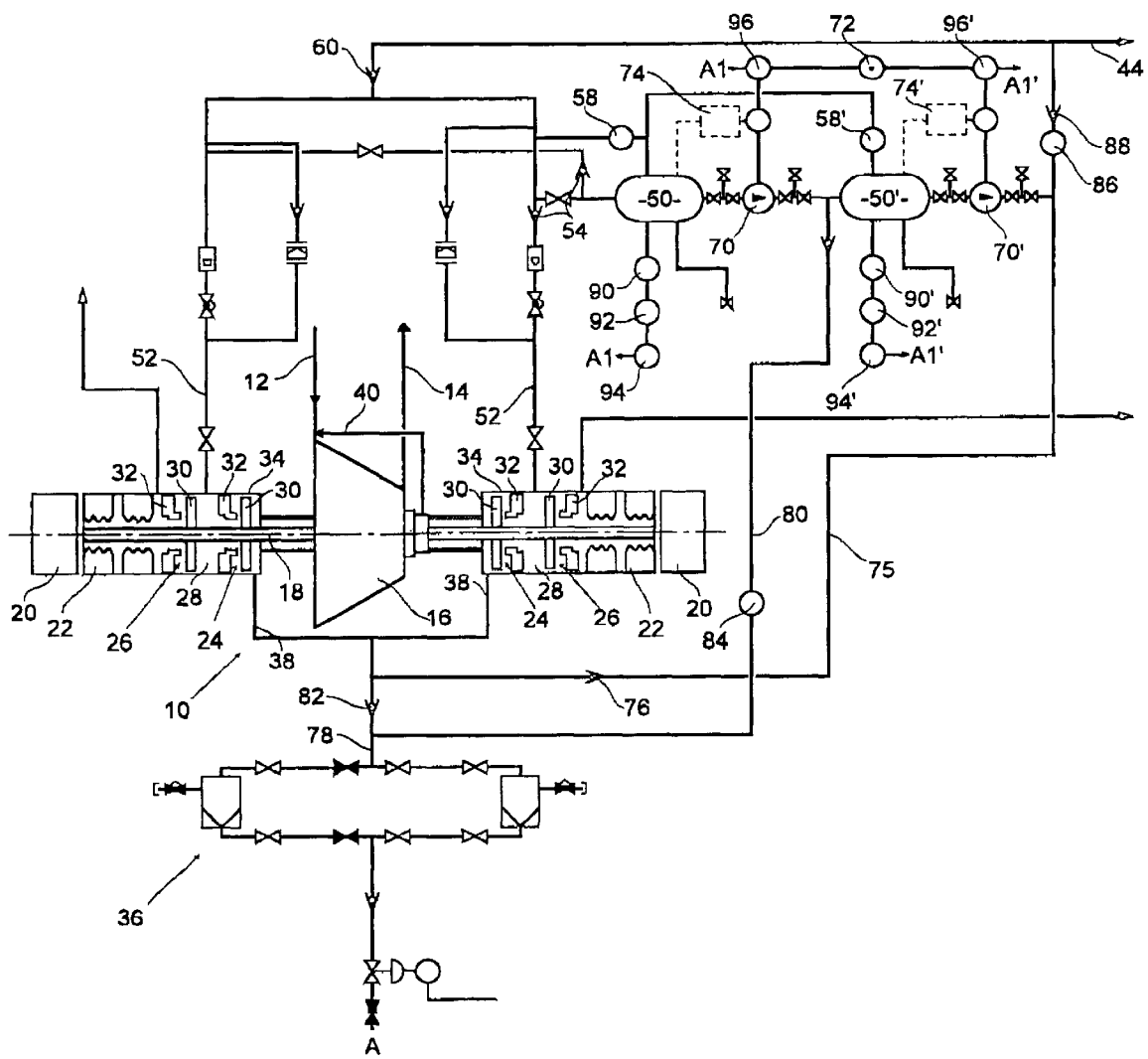
FIG. 2 shows diagrammatically an alternative embodiment of the present invention.

FIG. 2 illustrates the two-stage pressure intensification unit, which would be suitable for pressure intensification up to about 100 bar. The same reference numerals are used for the same components as those used in the embodiment illustrated in FIG. 1. In accordance with this embodiment, gas from the first reservoir 50 is compressed by pressure intensifier 70 in the manner disclosed above and is pumped to a second reservoir 50'. Under dynamic conditions, the second pressure intensifier 70' is controlled to maintain a pressure in the second reservoir 50' at a pre-set value (about 30 bar). In this embodiment, the line 80 is connected to the inlet to the second reservoir 50' and the pressure control valve 84 opens when pressure in the second reservoir 50' falls below a pre-set value (about 20 bar). The gas in the second reservoir 50' may then be pumped by a pressure intensifier 70' at the required delivery pressure (up to about 100 bar) and delivered back to the inlet 38.

While the invention has been disclosed above with reference to an application in which two seal assemblies are used, the invention is equally applicable to other seal assemblies where a gas seal is located on the inboard side of a chamber from which leakage gas is vented to a flare stack or atmosphere. The invention may furthermore be used for any system that has low volume or low pressure gas leakage.

We claim:

1. A seal assembly for sealing a pressurized gaseous product comprising:
   an inboard seal and an outboard seal, the inboard and outboard seals being spaced axially of one another to define a chamber;
   the inboard seal being a gas seal disposed between the gaseous product and the chamber;
   an inlet opening adjacent the inboard seal on the side of the inboard seal exposed to the gaseous product;
   a supply of clean gas at a pressure in excess of the pressure of the gaseous product;
   the chamber defined between the inboard and outboard seals being maintained at a pressure above atmospheric pressure to 5 barg above the atmospheric pressure;
   an outlet form the chamber intermediate of the inboard and outboard seals;
   a reservoir connected to the outlet for collection of clean gas that has leaked across the inboard and outboard seals into the chamber;
   the reservoir being connected back to the inlet;
   a pressure intensifier connected between the reservoir and the inlet for increasing the pressure of clean gas collected in the reservoir, to a pressure equal to at least the supply pressure and for feeding the leaked gas at increased pressure back to the inlet;
   means for delivering additional gas to the reservoir, when the pressure in the reservoir falls below a predetermined value;
   pressure in the reservoir is maintained below a predetermined maximum value;
   the reservoir is connected to one of:
      a flare stack, and when the reservoir is connected to the flare stack the predetermined maximum value being an operational back pressure of the flare stack; and
      an atmospheric vent, a spring loaded non-return valve being provided between the reservoir and the atmospheric vent, and when the reservoir is connected to the atmospheric vent the predetermined maximum value being a spring load pressure of the non-return valve.

2. A seal according to claim 1 in which the reservoir is connected to an atmospheric vent, a spring loaded non-return valve being provided between the reservoir and the atmospheric vent, the predetermined maximum value being a spring load pressure of the non-return valve.

3. A seal according to claim 1 in which the flare stack operational back pressure or the spring load pressure is above atmospheric pressure to 5 barg above atmospheric pressure.

4. A seal according to claim 1 in which flare stack operational back pressure or the spring load pressure is from 1 to 2 barg above atmospheric pressure.

5. A seal according to claim 1 in which under dynamic conditions the pressure intensifier maintains the pressure in the reservoir between predetermined limits.

6. A seal according to claim 5 in which the pressure intensifier maintains the pressure in the reservoir between 5% and 95% of the flare stack operational pressure or spring load pressure.

7. A seal according to claim 5 in which the pressure intensifier maintains the pressure in the reservoir between 30% and 95% of the flare stack operational pressure or spring load pressure.

8. A seal according to claim 1 in which the pressure intensifier is operated to pump gas from the reservoir at a rate in excess of the leakage across the seal.

9. A seal assembly according to claim 8 in which the means for delivering additional clean gas to the reservoir includes a pressure control valve, the pressure control valve opening to deliver clean gas to the reservoir, when pressure in the reservoir falls below the predetermined minimum value.

10. A seal assembly according to claim 1 in which the predetermined minimum value is 30% of the flare stack operational back pressure or the spring load pressure.

11. A seal assembly according to claim 9, in which the predetermined minimum value is 0.3 barg.

12. A seal assembly according to claim 1 including means to stop the pressure intensifier, if pressure in the reservoir falls below a second predetermined value.

13. A seal assembly according to claim 1 in which the pressure intensifier is a positive displacement pump.

14. A seal assembly according to claim 13 in which the pressure intensifier is a gas booster pump driven by compressed fluid.

15. A seal assembly according to claim 1 in which the pressure of the leakage gas is intensified in a multi-stage process, the gas from said reservoir being pumped by said pressure intensifier to a second reservoir and so on, until the required pressure is achieved.

16. A seal assembly according to claim 15 in which additional clean gas is introduced into the reservoir of a final stage, when pressure in that reservoir falls below a predetermined value.

17. A seal assembly according to claim 1 in which the clean gas is filtered product gas.

18. A seal assembly according to claim 1 in which the reservoir is connected to a flare stack, and the predetermined maximum value being an operational back pressure of the flare stack.

* * * * *